United States Patent
Alferness et al.

(10) Patent No.: US 6,247,064 B1
(45) Date of Patent: Jun. 12, 2001

(54) ENQUEUE INSTRUCTION IN A SYSTEM ARCHITECTURE FOR IMPROVED MESSAGE PASSING AND PROCESS SYNCHRONIZATION

(75) Inventors: Merwin H. Alferness, New Brighton; Charles R. Caldarale, Minneapolis; David C. Johnson, Roseville; David R. Johnson, Oakdale; James R. McBreen, Shoreview; Wayne D. Ward, New Brighton, all of MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 08/361,626

(22) Filed: Dec. 22, 1994

(51) Int. Cl.[7] .................................. G06F 9/00; G06F 9/46
(52) U.S. Cl. ............................................ 709/312; 709/103
(58) Field of Search .................................. 395/100, 375, 395/200.13, 250; 364/244.3; 709/310–332, 100–108, 200, 237, 223, 215; 710/54; 711/169; 713/502

(56) References Cited

U.S. PATENT DOCUMENTS

| | | | |
|---|---|---|---|
| 5,036,459 | * | 7/1991 | den Haan et al. ................. 364/200 |
| 5,081,572 | * | 1/1992 | Arnold ............................... 364/244.3 |
| 5,133,053 | * | 7/1992 | Johnson et al. ...................... 395/200 |
| 5,333,269 | * | 7/1994 | Calvignac et al. .................... 395/200 |
| 5,357,612 | * | 10/1994 | Alaiwan ............................. 364/244.3 |
| 5,375,215 | * | 12/1994 | Hanawa et al. .................... 364/244.3 |
| 5,386,514 | * | 1/1995 | Lary et al. ............................ 395/250 |
| 5,502,833 | * | 3/1996 | Byrn et al. ......................... 364/244.3 |
| 5,542,058 | * | 7/1996 | Brown, III et al. .................. 395/375 |
| 5,560,029 | * | 9/1996 | Papadopoulos et al. ............ 395/800 |
| 5,581,705 | * | 12/1996 | Passint et al. ................... 395/200.13 |

* cited by examiner

*Primary Examiner*—Majid Bonnokhah
*Assistant Examiner*—P G Caldwell
(74) *Attorney, Agent, or Firm*—Beth L. McMahon; Charles A. Johnson; Mark T. Starr

(57) ABSTRACT

A system and method for adding a queue entry containing message data to a queue shared by communicating, sequential processes includes an enqueue instruction. The enqueue instruction attaches a queue entry to either the tail or the head of the shared queue, as specified by an application programmer. Execution of the enqueue instruction includes blocking access to the queue by other processes, updating queue linkages, activating processes waiting on entries being made to the queue, monitoring interrupts, and validating the appropriate queue data structures. If desired, in lieu of adding a queue entry containing message data to the queue, the enqueue instruction inserts an event indicator into the shared queue structure, thereby providing synchronization capabilities between communicating processes.

22 Claims, 15 Drawing Sheets

ENQ a,*d,*x,b

ENQUEUE INSTRUCTION IN A SYSTEM ARCHITECTURE FOR IMPROVED MESSAGE PASSING AND PROCESS SYNCHRONIZATION

RELATED APPLICATIONS

This application relates to the concurrently filed application of Merwin H. Alferness, et. al., U.S. application Ser. No. 08/800,344 entitled "System Architecture for Improved Message Passing and Process Synchronization Between Concurrently Executing Processes," the disclosure of which is hereby incorporated by reference. U.S. application Ser. No. 08/800,344 is a continuation of U.S. application Ser. No. 08/362,632 filed on Dec. 22, 1994 and which is now abandoned.

BACKGROUND OF THE INVENTION

1. Field of the Invention

This invention relates generally to multiprocessing digital computer systems and particularly to instruction set architecture support for passing messages between concurrently executing processes and for synchronizing concurrently executing processes.

2. Background Information

The application of Merwin H. Alferness, et. al., Docket Number RA-3317, discloses a system architecture for providing improved message passing and process synchronization capabilities. Critical enhancements are made to operating system functions to permit processes executing within this system architecture to pass large messages between them without incurring large performance penalties associated with multiple copy operations on the message data. High level language support is provided in this system to enable an applications programmer to easily use the added functionality of the system. Hardware instruction set architecture support is also provided by the system to ensure that transfers of data and synchronization of communicating processes take place at machine speeds, rather than through multiple software layers of process control in the operating system.

The system architecture, known as the "Queuing Architecture," uses queues as a mechanism for message passing and process synchronization. A queue client process places entries or events on a queue. A queue server process receives entries or events from a queue. An entry contains a message passed between a client process and a server process over the queue. The message consists of data or control information. An event is an indication that a condition known to both the client process and server process has occurred, but which contains no message. Thus, an event works as a synchronization mechanism between processes. Each entry on a queue is represented in a unit of storage called a queue bank. The queue bank has a control area and a text area. The control area contains control information and pointers to other entries on a queue. The text area contains the message data. In the preferred embodiment of the present invention, the text area of a queue bank is limited in size to 262,144 36-bit words. A queue bank may be a queue header or a queue entry. A queue is made up of one queue header and zero or more queue entries. The queue header holds control information for the queue. Queue entries hold the message data being passed between processes. To pass a message from one process to another process in the Queuing Architecture, the sending process inserts the message data into a queue entry and then enqueues it to a queue. The receiving process, which may be waiting on entries being placed on the queue, dequeues the queue entry and processes the message data.

The implementation of the enqueue operation is of crucial importance for this system architecture. If the act of placing a queue entry on a queue is too slow, overall performance of the system suffers because of the frequency of use of the enqueue operation. Furthermore, the enqueue operation should be performed without copying the message data contained in the queue entry in order to maximize system throughput. Existing message passing systems usually copy the message data from the sending process's virtual space into the system memory used to represent a mailbox. The data is then copied from the mailbox into the receiving process's virtual space. Ideally, the processing time required to perform this copying of the message data should be eliminated. It would be more efficient if a mechanism was provided in the architecture of the system such that the message data could be transferred between processes via a shared queue structure without the need for copying. If this enqueue operation could be performed by the hardware of the system, rather than by the operating system kernel, system performance could be greatly improved.

SUMMARY OF THE INVENTION

An object of this invention is to efficiently add message data to be transferred from a sending process to a receiving process to a shared queue without copying the message data.

Another object of this invention is to enqueue a queue entry to a queue shared by multiple communicating processes in one instruction.

Still another object of this invention is to provide an application programmer with instruction set architecture support for improved message passing and process synchronization capabilities.

Yet another object of this invention is to provide a specialized instruction, which is part of the instruction set architecture of a computer system, to enqueue message data or an event indicator to a queue structure shared by multiple communicating processes.

A further object of this invention is to provide an enqueue instruction for enqueuing a queue entry containing message data to be passed between communicating processes to a shared queue in a minimum amount of system processing time.

Another object of this invention is to provide an enqueue instruction for enqueuing a queue entry containing message data to the front of a shared queue.

Another object of this invention is to provide a new instruction to efficiently pass an event indicator from one process to another process.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the Drawings and Description of the Preferred Embodiment, with the scope and aspects of the invention defined in the appended Claims.

According to the present invention, the foregoing and other objects and advantages are attained by a new instruction which adds a queue entry containing message data to be transferred from a sending process to a receiving process to a queue shared by the processes. If desired by the programmer, in lieu of adding a queue entry containing message data, the new instruction inserts an event indicator into the shared queue structure, thereby providing synchronization capabilities between the two communicating processes.

In accordance with an aspect of this invention, a computer system, executing multiple processes controlled by an operating system, has at least one processor for executing instructions and a main storage unit accessible by the processes. The main storage unit has units of data storage called queue banks, wherein each queue bank represents a queue header element or a queue entry element of a queue. The queue, which is a linked list of one queue header and zero or more queue entries, is shared by communicating processes. Each queue entry contains a group of data signals (i.e., the message data) to be communicated from one process to another. The queue header contains control information and an event indicator, which is used for process synchronization. The system supports interprocess communication by executing an enqueue instruction, which is part of the instruction set architecture of the system. The implementation details of the enqueue instruction include mechanisms for accessing a queue and a new queue entry, and for linking the new queue entry to the selected queue.

In accordance with another aspect of the invention, a method of executing a single instruction to add a new queue entry to a queue shared by multiple communicating processes comprises the steps of calculating the address of the queue header of a queue selected by the operands of the instruction, calculating the address of the new queue entry selected by the operands of the instruction, and updating the links in the queue header and queue entries to add the new queue entry to the queue.

Still other objects and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended Claims.

DESCRIPTION OF THE PREFERRED EMBODIMENT

The Enqueue (ENQ) and Enqueue To Front (ENQF) instructions are used to enqueue an entry or event to a queue that is used for passing messages between processes and for synchronizing processes. The ENQ and ENQF instructions provide instruction set architecture support for implementing the Queuing Architecture in an efficient manner. Co-pending, related application Docket Number RA-3317 fully describes the Queuing Architecture system in which the present invention is embodied, the disclosure of which is hereby incorporated by reference.

Figure 1:
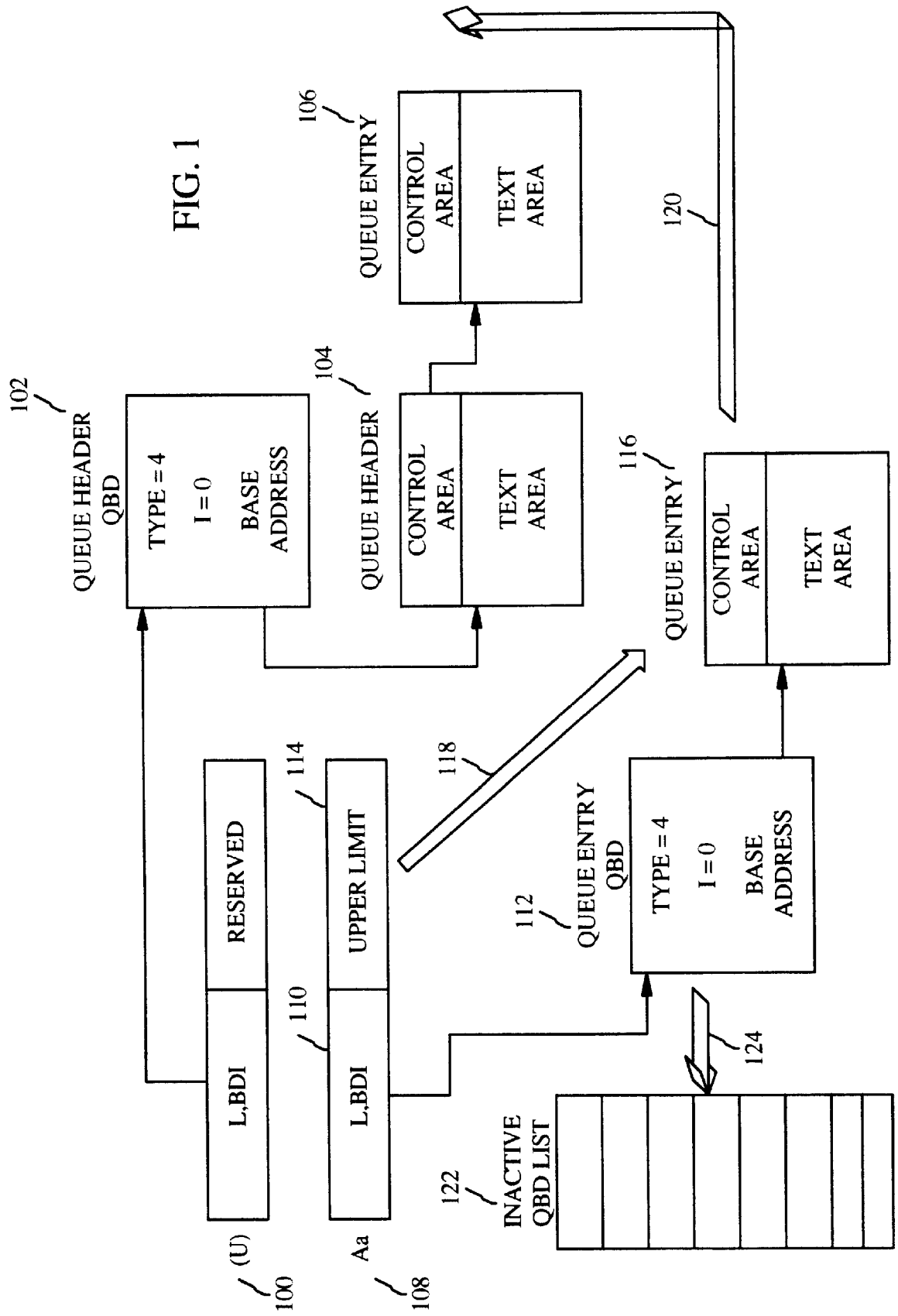
FIG. 1 is a block diagram illustrating the functionality of the Enqueue instruction.

FIG. 1 is a block diagram illustrating the functionality of the Enqueue instruction. A Queue Bank Descriptor (QBD) is the basic storage structure used for managing the system addressing environment. A QBD is identified by a Level, Bank Descriptor Index (L,BDI) value. In the preferred embodiment, all addresses in storage can be identified by virtual addresses. A virtual address is a 36-bit word identifying the name of the bank in which the address lies and the position of the address within the bank. The Level (L) selects one of eight Bank Descriptor Tables (BDTs) (not shown) and the Bank Descriptor Index (BDI) selects one of up to 32,768 Bank Descriptors in the selected BDT. QBDs are used to access Queue Banks, which are the fundamental storage elements making up a Queue in the system. The L,BDI value of a Queue Header of a Queue is specified by the contents of the Instruction Operand Address "(U)" 100. The value of (U) is formed by adding the unsigned value of the displacement field of the instruction (not shown in FIG. 1) to the signed modifier portion of an "X" register (not shown) specified by the "x" field of the instruction (not shown). For ENQ and ENQF instructions, the contents of the memory location specified by Bits 0–17 of (U) point to the Queue Header QBD 102. Bits 18–35 of (U) are reserved. The Base Address field in the Queue Header QBD 102 points to the Queue Header 104. In the example shown in FIG. 1, this Queue has only one Queue Entry 106. The Queue Header 104 has been previously created by a CREATE$QH EXEC operating system service call (as disclosed on pp. 24–29 of related application Docket Number RA-3317) and the Queue Entry 106 has been enqueued via an earlier execution of the ENQ instruction.

The other main operand of the ENQ/ENQF instruction is the Arithmetic Register "Aa" operand 108. In the preferred embodiment, the Arithmetic Registers are capable of providing input for or accepting results from arithmetic operations. The "a" field in the ENQ/ENQF instruction (not shown in FIG. 1) specifies which Arithmetic Register is to be used to accept results from the execution of this instruction. Bits 0–17 of Aa are the L,BDI 110 of the QBD 112 of the new Queue Entry (that is, the Queue Entry to be enqueued). However, if the L,BDI 110 of the Queue Entry is zero, then an event is being enqueued. The Count (not shown) (which is the number of entries on the Queue) is not returned when an event is enqueued. If the L,BDI 110 is not zero, then this field points to the new Queue Entry's QBD. If the Resize On ENQ flag (not shown) is enabled in the Control Area of the Queue Header 102, Bits 18–35 of Aa 108 specify the new Upper Limit value for the Queue Entry to be enqueued, otherwise this field is ignored. Complete definitions of the Queue Header and Queue Bank Descriptor (QBD) data structures are disclosed in related application Docket Number RA-3317 on pp. 38–42. When the Resize On ENQ flag is clear at the start of an enqueue operation, the enqueued Queue Entry's Control Area Upper Limit field (not shown) is not modified.

The Upper Limit field specifies the number of words of data in the Text Area of the Queue Entry. The Text Area is the data structure that holds the message data to be passed between processes. This Upper Limit 114 is stored in the Upper Limit field of the Control Area of the Queue Entry 116. This is indicated on FIG. 1 by action Arrow 118. If the Queue Header 104 indicates that enqueuing to the head is forced, ENQ enqueues to the head of the Queue, otherwise ENQ enqueues to the tail of the Queue. This is shown by action Arrow 120. The appropriate links in the Queue Header's Control Area are updated to reflect the addition of the Queue Entry 116 to the Queue. The Arithmetic Register Aa+1 (not shown) is written with the Queue's initial Count (i.e., the Count prior to the enqueue operation). The Queue Entry QBD 112 is returned to the Inactive QBD List 122. This is represented on FIG. 1 as action Arrow 124. Finally, if the Queue's Wait List Count (not shown) is non-zero, following the enqueue of the event or entry, a server process Activity Save Area (ASA) is moved from the Queue's Wait List (not shown) to a Switching Queue (not shown). An ASA holds the state information of server processes waiting for an entry to be placed on the Queue. The Wait List is a linked list of ASAs. A Switching Queue holds the state information for processes ready for execution.

Processing for the Enqueue To Front (ENQF) instruction is very similar to processing for the ENQ instruction, except the linkage of the Queue Entry 116 to the Queue takes place at the head of the Queue. In the example shown in FIG. 1, Queue Entry 116 is linked into the Queue ahead of Queue Entry 106 and the appropriate pointers are updated in the Queue Header 104. It is not always possible to enqueue to the front of a queue. If the Queue Header indicates that enqueuing to the head of the Queue is not allowed, execution of an ENQF instruction results in an Addressing Exception error.

Figure 2:
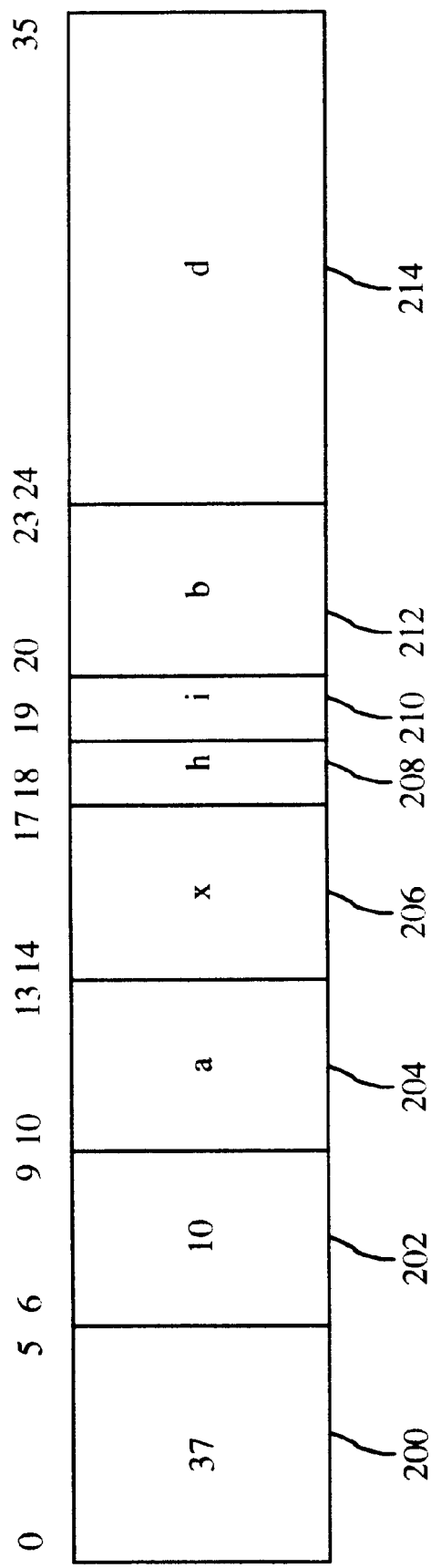
FIG. 2 is a diagram of the instruction format of the Enqueue instruction.

FIG. 2 is a diagram of the instruction format of the ENQ instruction. In the preferred embodiment, the ENQ instruction is designed to operate as part of the instruction set architecture of the 2200 Series computer system, commercially available from Unisys Corporation. instructions in this system architecture consist of a 36-bit word in a format which identifies the function code and the registers and/or the storage words which are to be operated on by the processor. The particular format used depends on the execution mode and the type of instruction. There are two execution modes of instruction, Extended Mode and Basic Mode. The ENQ and ENQF instructions are Extended Mode instructions. The Function Code field 200, specifies the operation to be performed by the instruction. For the ENQ instruction, the value of the function code field is 37. The Extended Function Code field 202, acts as part of the Function Code for some instructions. For the ENQ instruction, the Extended Function Code is used and has a value of 10. The Register Operand Address "a" field 204 specifies an Arithmetic Register for use as a register operand. The selected Aa register is used to access the L,BDI of the Queue Entry QBD, and the Upper Limit value of the Queue Entry.

The Index Register "x" field 206, when non-zero, specifies an Index Register to be used in the indexing operation to form the instruction operand address. The Index Incrementation Designator "h" bit 208 is used to increment the "X" register during the execution of the instruction. The Indirect Addressing Designator "i" bit 210 is used as an extension of the "b" field described below, or as a relative addressing flag. The Base Register Selector "b" field 212 specifies a Base Register which describes the Bank containing the instruction operand. The Displacement Address "d" field 214 contains a displacement value that is used in conjunction with the modifier portion of the Index Register specified by the "x" field 206 to form the Instruction Operand Address called "U". The Instruction Operand Address "U" is formed by adding (using 1's complement arithmetic) the unsigned value (zero-filled on the left) of the Displacement Address "d" field 214 to the signed modifier portion of the Index Register specified by the "x" field 206, and then adding this value to the base value from the "b" register (using 2's complement arithmetic). The contents of U are used to reference the L,BDI of the Queue Header QBD as described above. The definition of the Enqueue To Front (ENQF) instruction is the same as is shown in FIG. 2, except the value of the Extended Function Code 202 must be 11.

Figure 3:
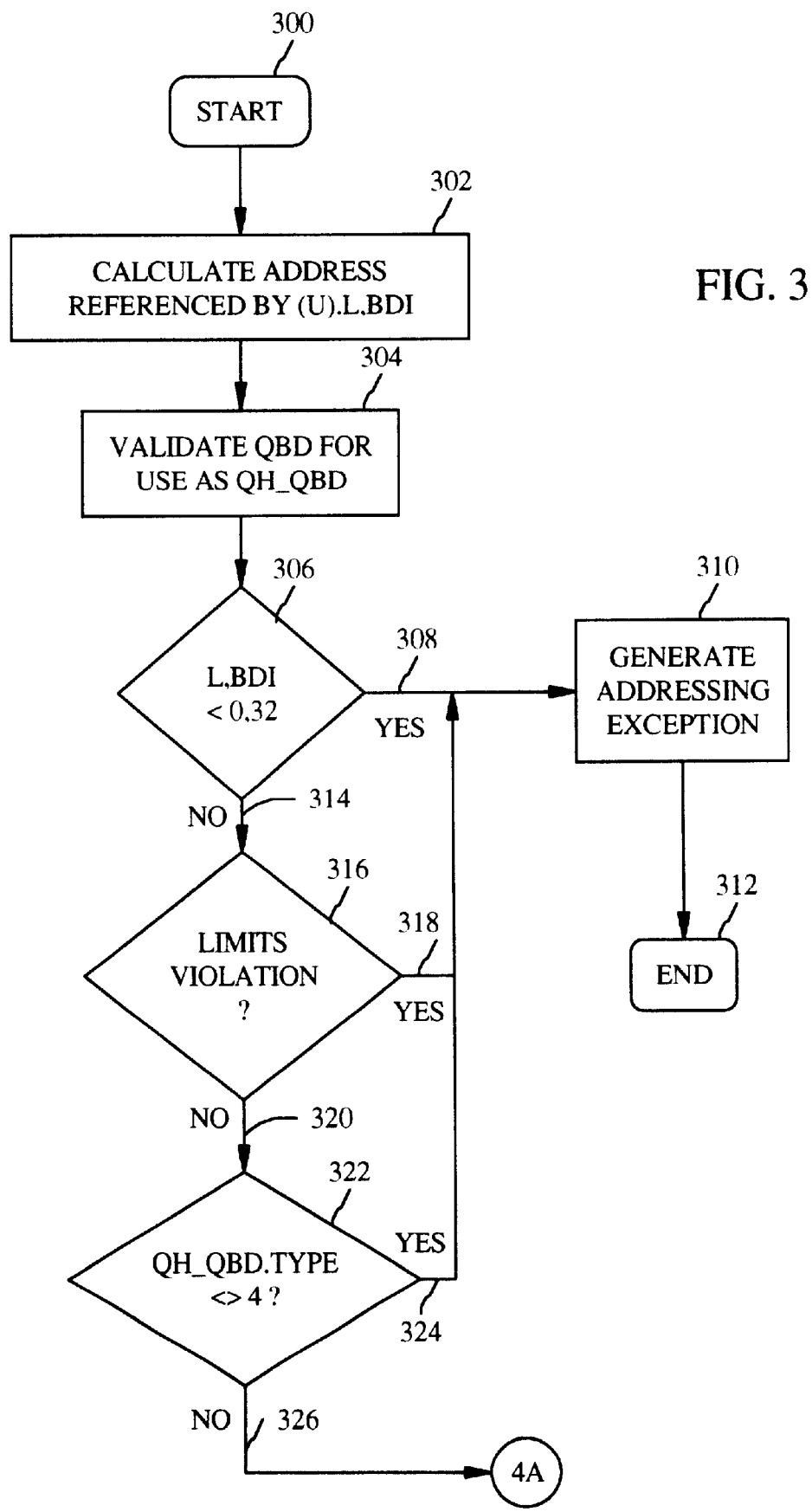
FIGS. 3–15 are flow diagrams describing the processing steps for executing the ENQ/ENQF instructions.

FIGS. 3–15 are flow diagrams describing the processing steps for executing the ENQ/ENQF instructions. Referring now to FIG. 3 and Start Step 300, the address of the QBD referenced by the value in the L,BDI field of (U) is calculated at Step 302. This QBD must be validated for use as a QBD for the Queue Header (QH) at Step 304. The validation process continues as follows. At Test Step 306, if L,BDI is less than 0.32, then an error has been detected and Yes path 308 is taken to Step 310. At this step, an addressing exception error is generated and processing of the ENQ/ENQF instruction ends at End Step 312. If no error is detected at Test Step 306, then No path 314 is taken to Test Step 316. At Test Step 316, if a limits violation is detected on the QBD reference, then Yes path 318 is taken to Step 310, where an addressing exception error is generated and processing ends at Step 312. If no error is detected at Test Step 316, then No path 320 is taken to Test Step 322. At Test Step 322, if the Type field in the Queue Header QBD specifying the type of bank descriptor is not equal to four, then an error has been detected and Yes path 324 is taken to Step 310, where the addressing exception is generated. If no error occurred, then No path 326 is taken to FIG. 4 via connector 4A.

Figure 4:
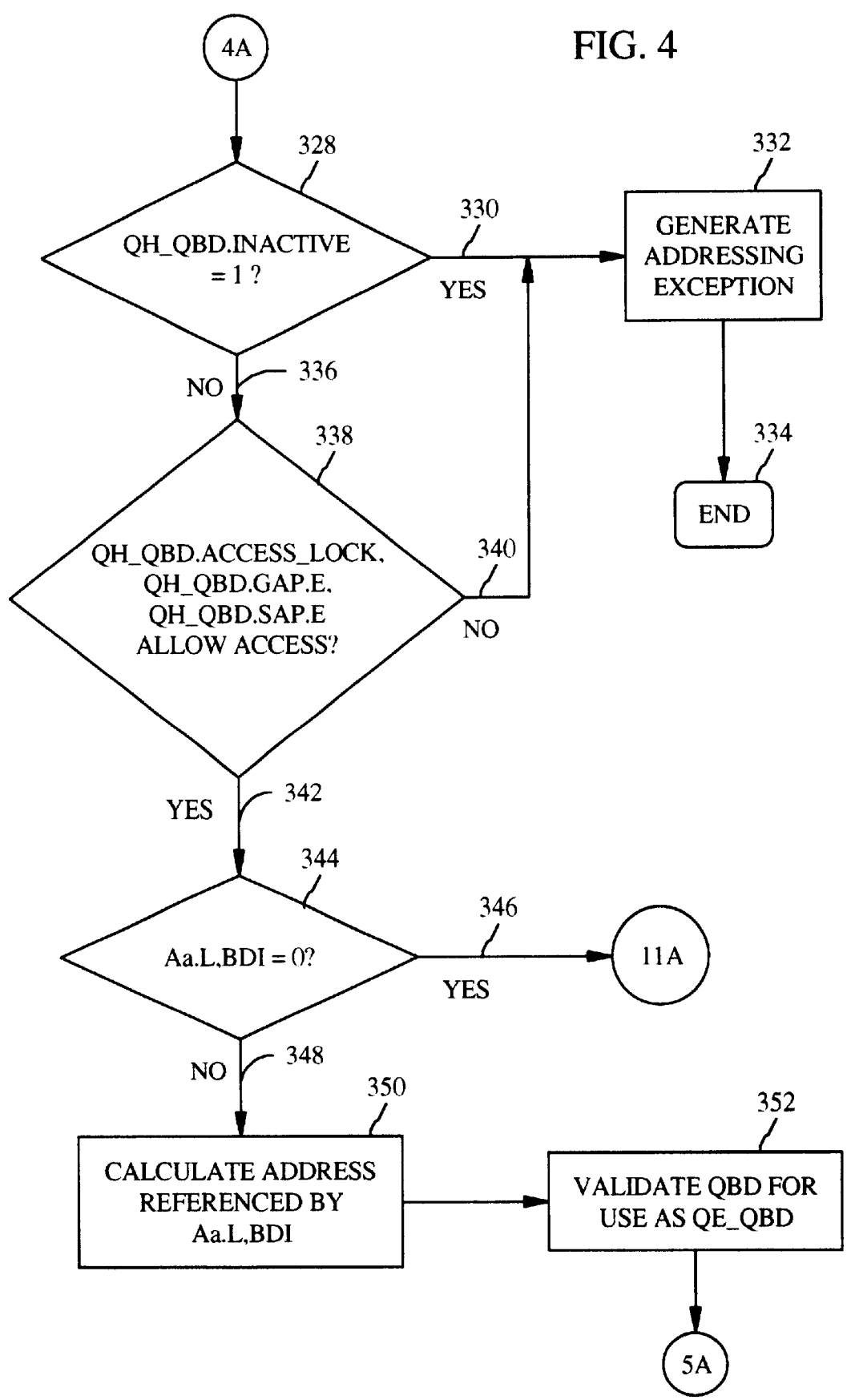

Referring to FIG. 4, at Test Step 328, a check is made to determine if the Queue Header QBD is inactive. If it is an inactive QBD, then an error is detected and Yes path 330 is taken to Step 332. At this step an addressing exception error is generated and processing ends at End Step 334. If the Queue Header QBD is active (i.e., it is being used to reference the Queue), then No path 336 is taken to Test Step 338. At Test Step 338, the security fields of the Queue Header QBD are validated. If the Queue Header QBD's Access_Lock, General Access Permission (GAP) Execute, and Special Access Permission (SAP) Execute bits are set to not allow enqueue access to the Queue, then an error is detected and No path 340 is taken to Step 332 for further error processing. If the security bits allow access to the Queue, then Yes path 342 is taken to Test Step 344. If the Arithmetic Register specified by the "a" field of the ENQ/ENQF instruction has an L,BDI value that is equal to zero, then the object to be enqueued to the Queue is an event. Thus, Yes path 346 is taken to FIG. 11 via connector 11A for further event processing. Otherwise the object to be enqueued is an entry which contains message data, so No path 348 is taken to Step 350. At Step 350, the address of the QBD referenced by the L,BDI field selected by the Arithmetic Register specified by the "a" field of the instruction is calculated. Next, the QBD selected by this computation must be validated for use as the QBD for the new Queue Entry (Step 352). Processing for enqueuing an entry continues on FIG. 5 via connector 5A.

Figure 5:
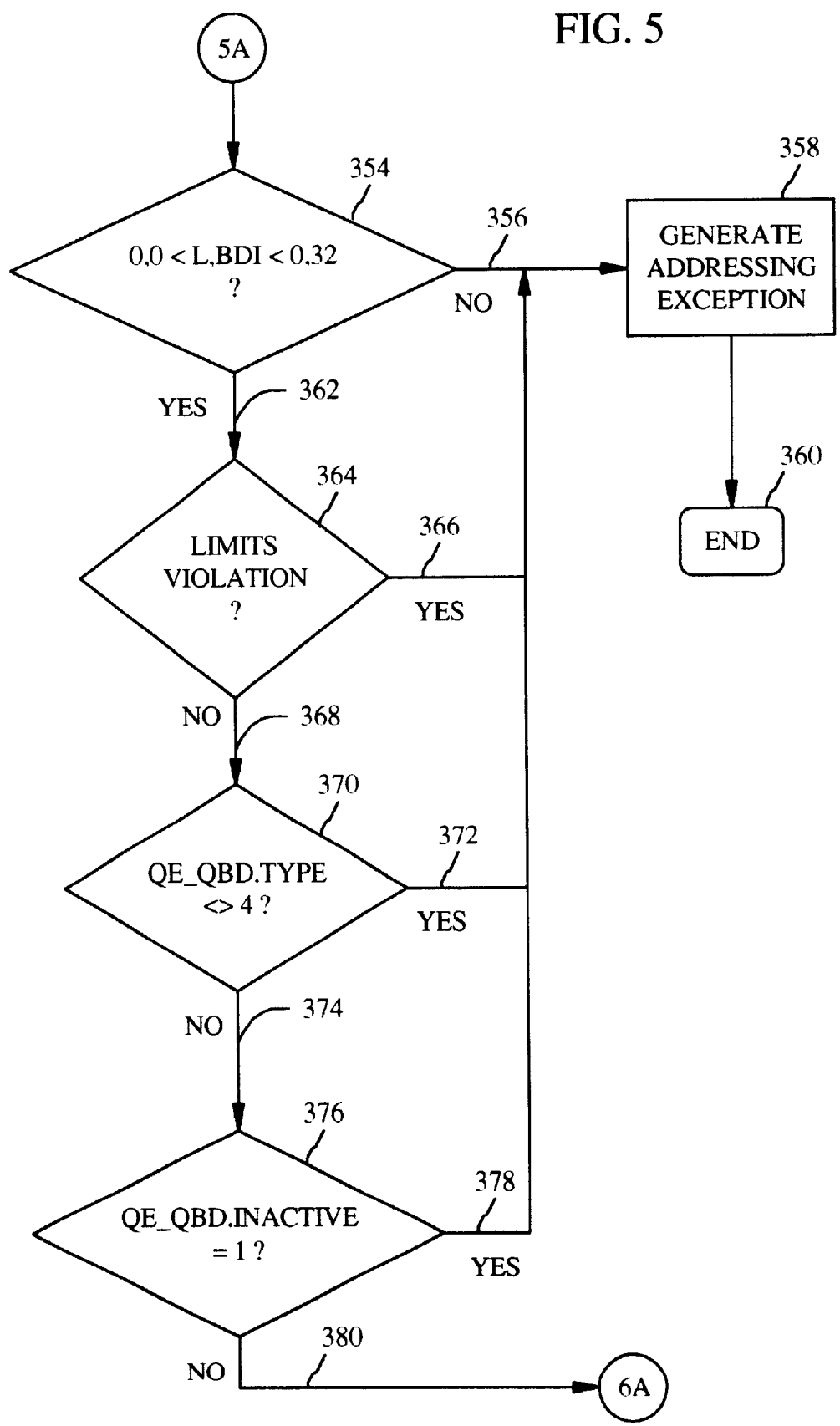

At Test Step 354 on FIG. 5, the L,BDI value is checked to ensure it is greater than 0.0 and less than 0.32. If it is not, then No path 356 is taken to Step 358, where an addressing exception error is generated and processing ends at Step 360. If no error is detected at Test Step 354, then Yes path 362 is taken to Test Step 364. At this Step, a limits violation may be detected. If there is a limits violation, Yes path 366 is taken to Step 358 for further error processing. If there is no limits violation, No path 368 is taken to Test Step 370. At Test Step 370, if the Type field in the Queue Entry QBD specifying the type of bank descriptor is not equal to four, then an error has been detected and Yes path 372 is taken to Step 358, where the addressing exception is generated. If no error occurred, then No path 374 is taken to Test Step 376, where a check is made to determine if the Queue Header QBD is inactive. If the inactive flag in the Queue Entry QBD is set to one, then an error is detected and Yes path 378 is taken to Step 358. At this step an addressing exception error is generated and processing ends at End Step 360. If the Queue Entry QBD is active (i.e., it is being used to reference the Queue Entry), then No path 380 is taken to FIG. 6, via connector 6A.

Figure 6:
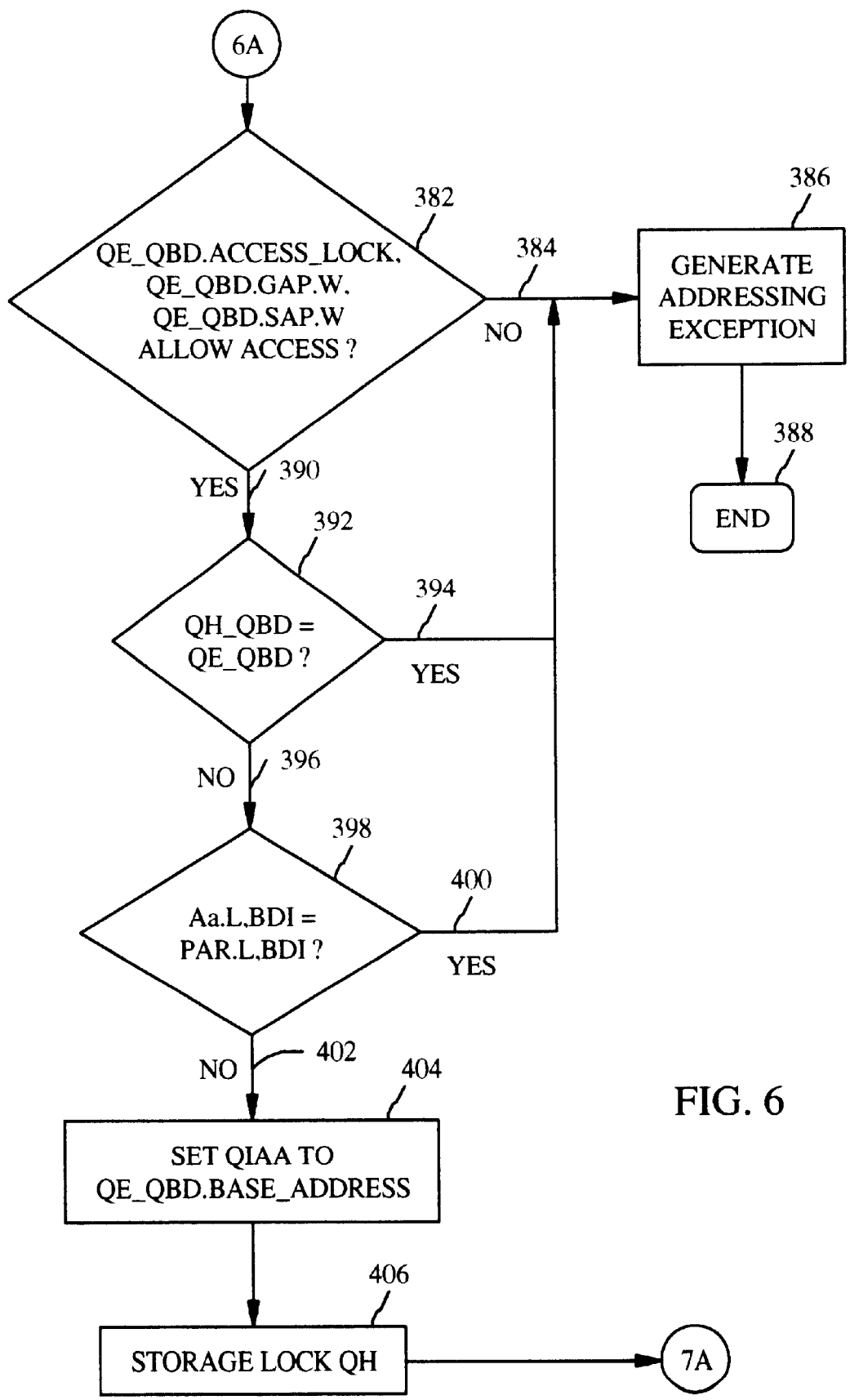

On FIG. 6, at Test Step 382, the security fields of the Queue Entry QBD are validated. If the Queue Entry QBD's Access_Lock, General Access Permission (GAP) Write, and Special Access Permission (SAP) Write bits are set to not allow access to the Queue Entry, then an error is detected and No path 384 is taken to Step 386, where an addressing exception is generated and processing ends at Step 388. If the security bits allow enqueue access to the Queue Entry, then Yes path 390 is taken to Test Step 392. If the Queue Header QBD is the same object as the Queue Entry QBD, an error has occurred and Yes path 394 is taken to Step 386 for further error processing. If no error occurred, then No path 396 is taken to Test Step 398. At this step, a check is made to determine if the L,BDI value referenced by the Arithmetic Register specified by the "a" field from the ENQ/ENQF instruction is the same as that specified by the computer system's Program Address Register (PAR). This would be the case if a process attempted to enqueue the bank holding the current instruction. If the values are the same, then Yes path 400 is taken to Step 386 for further error processing. Otherwise processing continues via No path 402 to Step 404. At Step 404, the Base Address of the Queue Entry QBD is saved by storing it into temporary holding register QIAA. Next, access to the Queue Header by other processes is prevented by setting the storage lock at Step 406. Processing continues on FIG. 7 via connector 7A.

Figure 7:
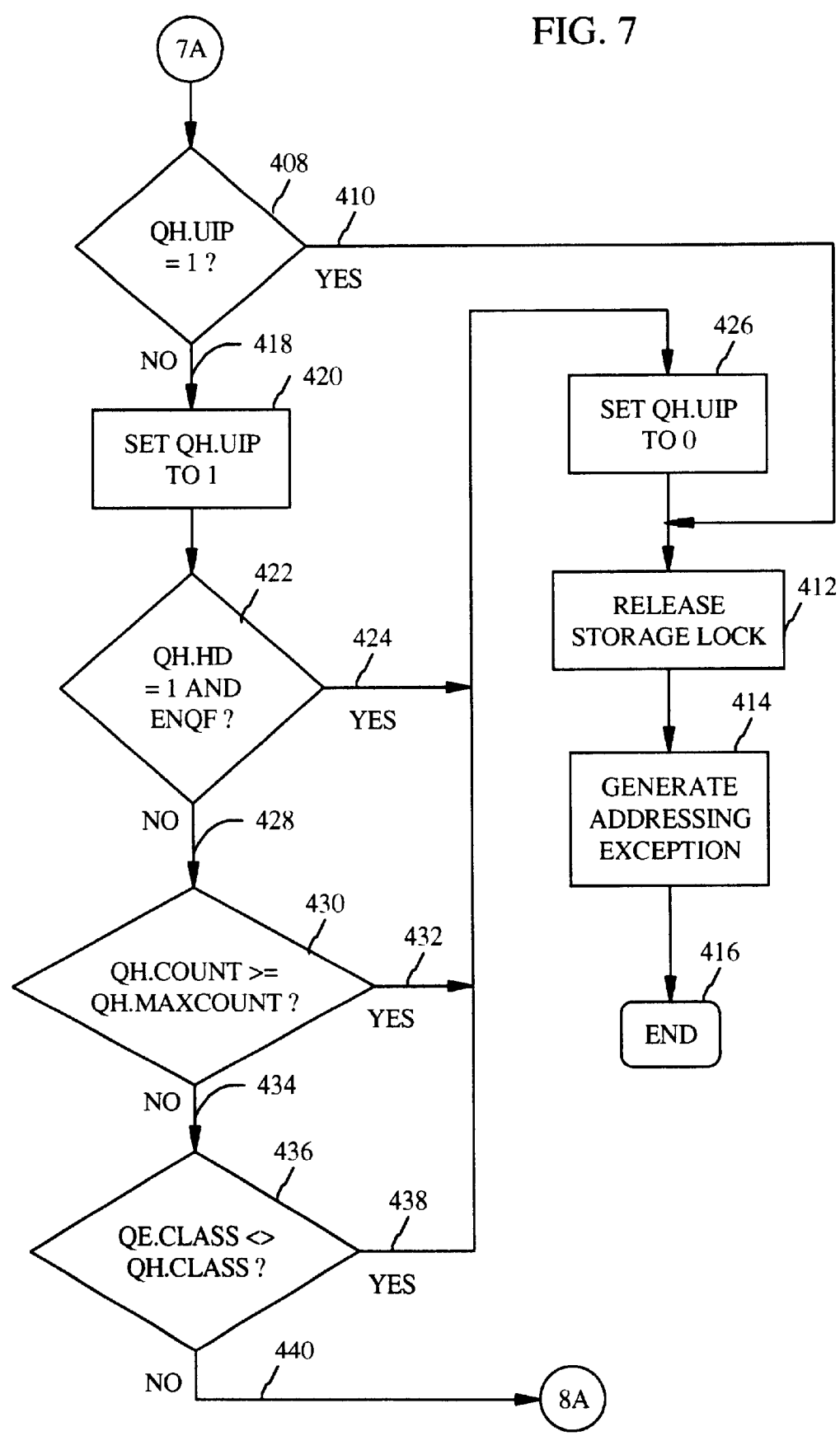

Referring now to FIG. 7, at Test Step 408, if the Update In Progress (UIP) bit is already set in the Queue Header, then an error condition has been detected and Yes path 410 is taken to Step 412. The UIP is used as an extra security check to detect corruption of the Queue. At Step 412, the storage lock on the Queue Header is released. At Step 414, an addressing exception error is generated and processing then ends at End Step 416. If the Queue Header UIP bit was not already set, then No path 418 is taken to Step 420, where the UIP bit is set. At Test Step 422, if the Head (HD) field of the Queue Header is set to one, meaning enqueuing to the head of the Queue is not allowed and the current instruction is an Enqueue To Front (ENQF), then Yes path 424 is taken to Step 426. At Step 426, the newly set UIP bit is cleared again, thereby again allowing access to the Queue by other processes. Error processing then continues with Step 412. If no error was detected at Test Step 422, then No path 428 is taken to Test Step 430. If the number of entries already enqueued to this Queue (specified by the Count field of the Queue Header) is greater than or equal to the maximum allowed (specified by the Maxcount field of the Queue Header), then no new Queue Entries may be enqueued before a Queue Entry is dequeued. If this is the case, Yes path 432 is taken to Step 426, where the UIP bit is cleared and error processing continues. If there is still room on the Queue for more Queue Entries, then No path 434 is taken to Test Step 436. At Test Step 436, if the Class field of the Queue Entry does not match the Class field of the Queue Header, then the Queue Entry cannot be enqueued to this Queue. Thus, an error is detected and Yes path 438 is taken to Step 426, where the UIP bit is cleared and error processing continues. If the Class fields match, then the No path 440 is taken to FIG. 8 via connector 8A.

Figure 8:
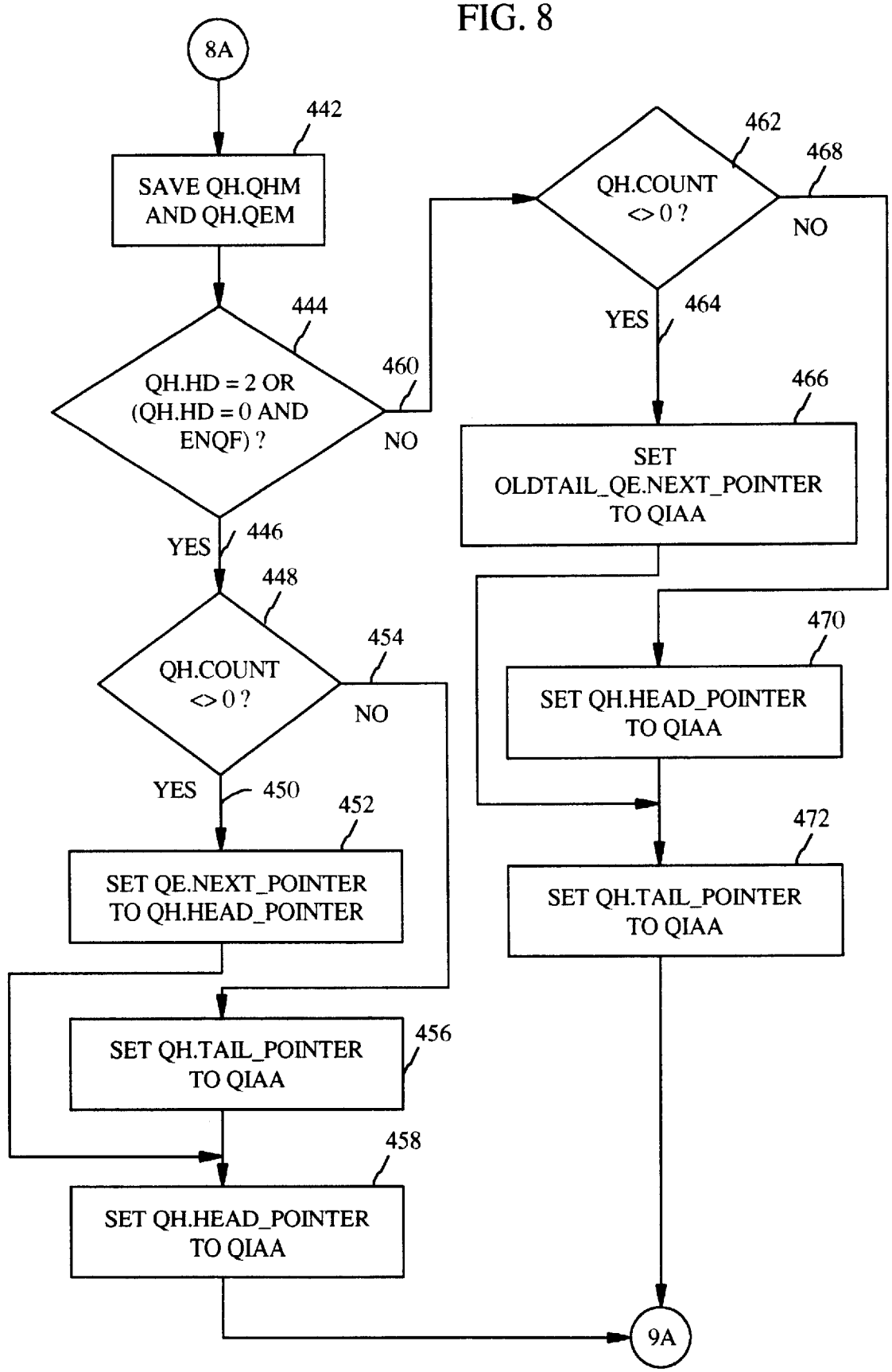

At Step 442 on FIG. 8, the Queue Header Monitor (QHM) and the Queue Entry Monitor (QEM) bits from the Queue Header are saved for future use. Next, at Test Step 444, if the Head (HD) field of the Queue Header indicates that a forced enqueue to the head is selected, or the Head field indicates that an enqueue to the head of the Queue is allowed and the current instruction is an Enqueue To Front (ENQF), then the Queue Entry is to be enqueued to the front of the Queue; else it is to be enqueued to the tail of the Queue. If an enqueue to the front is desired, Yes path 446 is taken to Test Step 448. If the Queue is not empty (that is, the Count field of the Queue Header is non-zero), then Yes path 450 is taken to Step 452. At this step, the Next Pointer of the Queue Entry is set to the Head Pointer of the Queue Header. Processing then continues at Step 458. If the Queue is empty (that is, the Count field of the Queue Header is zero), then No path 454 is taken to Step 456. At this step, the Tail Pointer of the Queue Header is set to the temporary holding register QIAA. At Step 458, the Head Pointer of the Queue Header is set to the temporary holding register QIAA, thereby completing the linkage to enqueue the Queue Entry to the front of the Queue. Processing then continues on FIG. 9 via connector 9A. If enqueue to the tail is desired, No path 460 is taken from Test Step 444 to Test Step 462. If the Queue is not empty (that is, the Count field of the Queue Header is non-zero), then Yes path 464 is taken to Step 466. At this step, the Next Pointer of the Queue Entry that was the tail of the Queue prior to the current enqueue, is set to the temporary holding register QIAA. Processing then continues at Step 472. If the Queue is empty (that is, the Count field of the Queue Header is zero), then No path 468 is taken to Step 470. At this step, the Head Pointer of the Queue Header is set to the temporary holding register QIAA. At Step 472, the Tail Pointer of the Queue Header is set to the temporary holding register QIAA, thereby completing the linkage to enqueue the Queue Entry to the tail of the Queue. Processing then continues on FIG. 9 via connector 9A.

Figure 9:
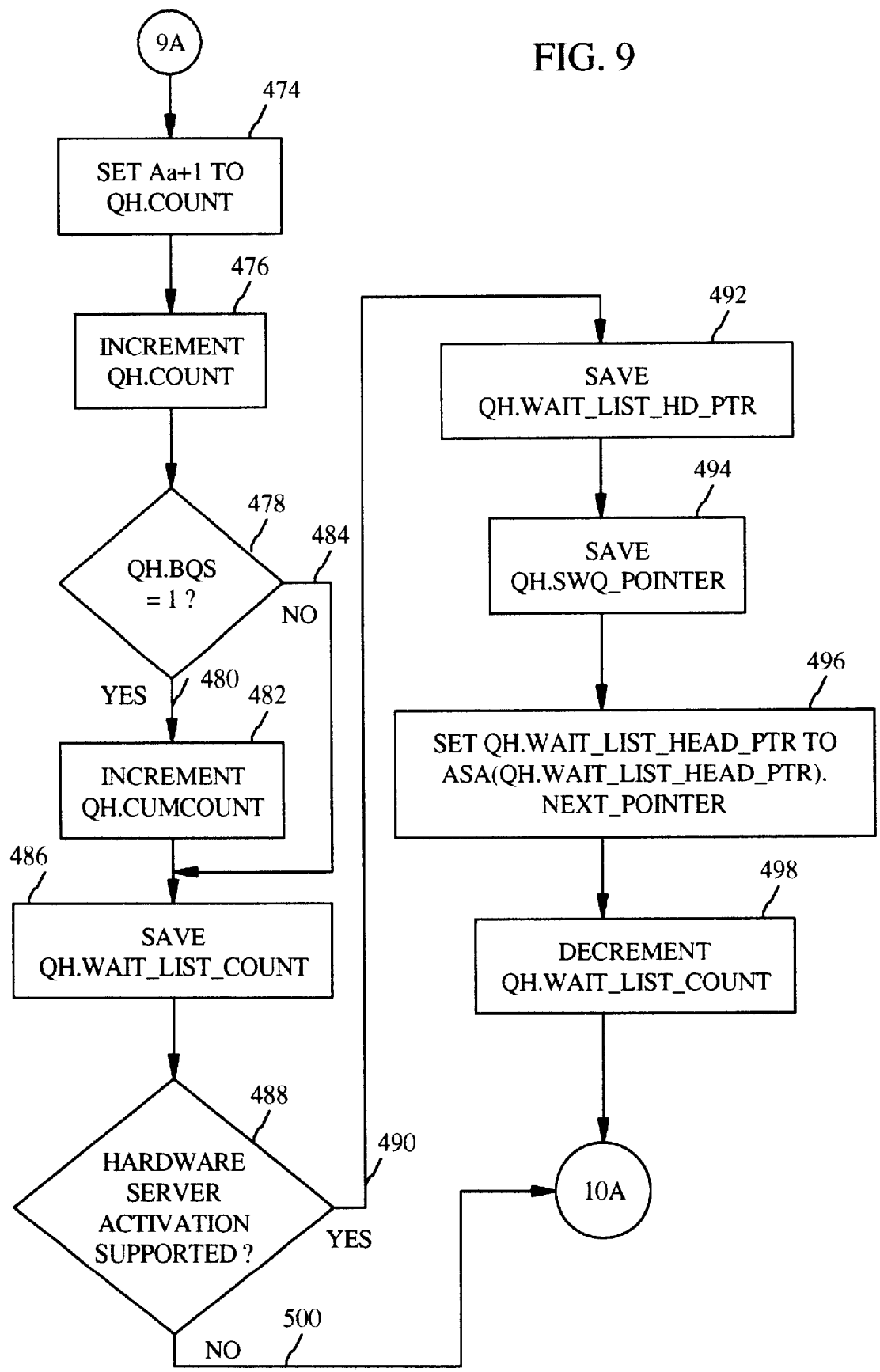

Referring to FIG. 9, at Step 474, the Arithmetic Register selected by adding one to the "a" value indicated by the ENQ/ENQF instruction is set to the number of Queue Entries on the Queue (the Count field in the Queue Header). The Count field is then incremented at Step 476 to reflect the addition of the Queue Entry to the Queue. If Basic Queue Statistics (BQS) is enabled for this Queue (Test Step 478), then Yes path 480 is taken to Step 482. At Step 482, the Cumulative Count (Cumcount) of the number of Queue Entries placed on the Queue is incremented. If BQS is disabled for this Queue, then No path 484 is taken to Step 486. At Step 486, the Wait List Count for this Queue is saved. The Wait List Count is the number of server processes waiting for an entry to be enqueued to the Queue. If hardware server activation is currently supported (Test Step 488), then Yes path 490 to Step 492. At this step, the Wait List Head Pointer for the Queue Header is saved. At Step 494, the Switching Queue Pointer for the Queue Header is also saved. At Step 496, the Wait List Head Pointer for the Queue Header is set to the Next Pointer of the Wait List Head Pointer from the Activity Save Area (ASA) for this process. The Wait List Count is then decremented at Step 498 and processing continues on FIG. 10 via connector 10A. If hardware server activation is not supported, then No path 500 is taken and processing also continues on FIG. 10.

Figure 10:
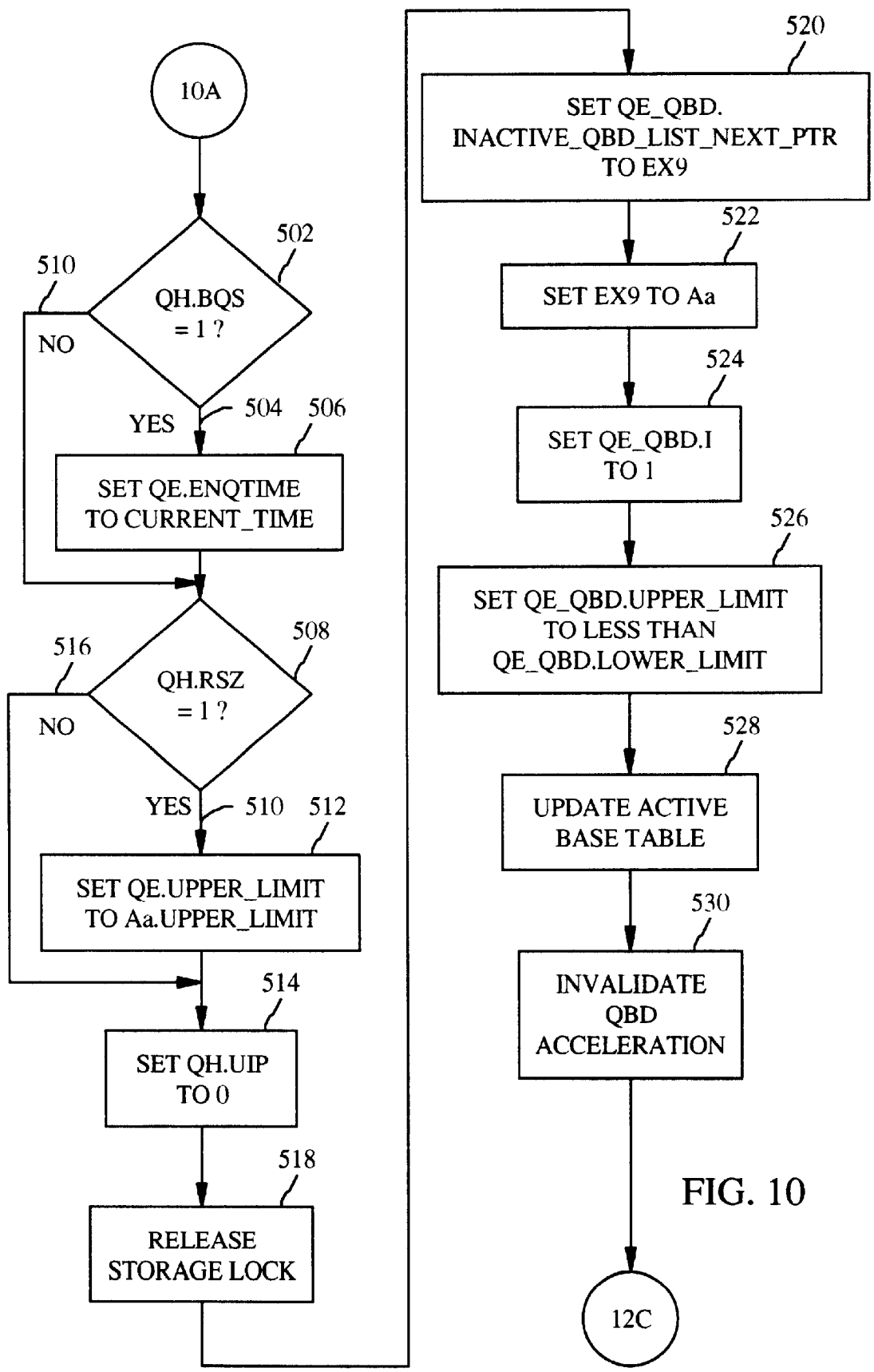

At Test Step 502 on FIG. 10, the Basic Queue Statistics (BQS) bit of the Queue Header is checked again. If it is set, then Yes path 504 is taken to Step 506, where the Enqueue Time field of the Queue Entry is set to the current time from the system dayclock. Processing then continues with Test Step 508. If BQS is not enabled, No path 510 is taken to Test Step 508. At Test Step 508, if the Resize On Enqueue (RSZ) bit in the Queue Header is set, then Yes path 510 is taken to Step 512. The Upper Limit of the Queue Entry is set to the Upper Limit specified by the Arithmetic Register selected by the "a" field from the ENQ/ENQF instruction. Processing continues with Step 514. If the RSZ bit is not set, No path 516 is taken to Step 514. At Step 514, the Update In Progress (UIP) bit in the Queue Header is set to zero, and the storage lock on the Queue Header is released at Step 518, thereby allowing access to the Queue by other processes. The Queue Entry QBD is returned to the Inactive QBD List by setting the Inactive QBD List Pointer in the QBD to the contents of Executive Register X9 at Step 520, and by setting Executive Register X9 to the Arithmetic Register Aa at Step 522. The enqueued Queue Entry is then removed from the enqueuing process's visibility. The QBD for the Queue Entry is marked as inactive by setting the Inactive (I) bit in the Queue Entry QBD to one at Step 524. The Upper Limit and Lower Limit are written so that the QBD has collapsed limits by setting the Upper Limit in the Queue Entry QBD to a value that is less than the Lower Limit at Step 526. The Active Base Table (ABT) is then updated at Step 528 by writing 0,0 into each entry where ABT.L,BDI equals Aa.L,BDI, setting ABT.Offset to be architecturally undefined, and marking the associated Base Register void. Any QBD acceleration is invalidated at Step 530 and processing proceeds to FIG. 12 via connector 12C.

Figure 11:
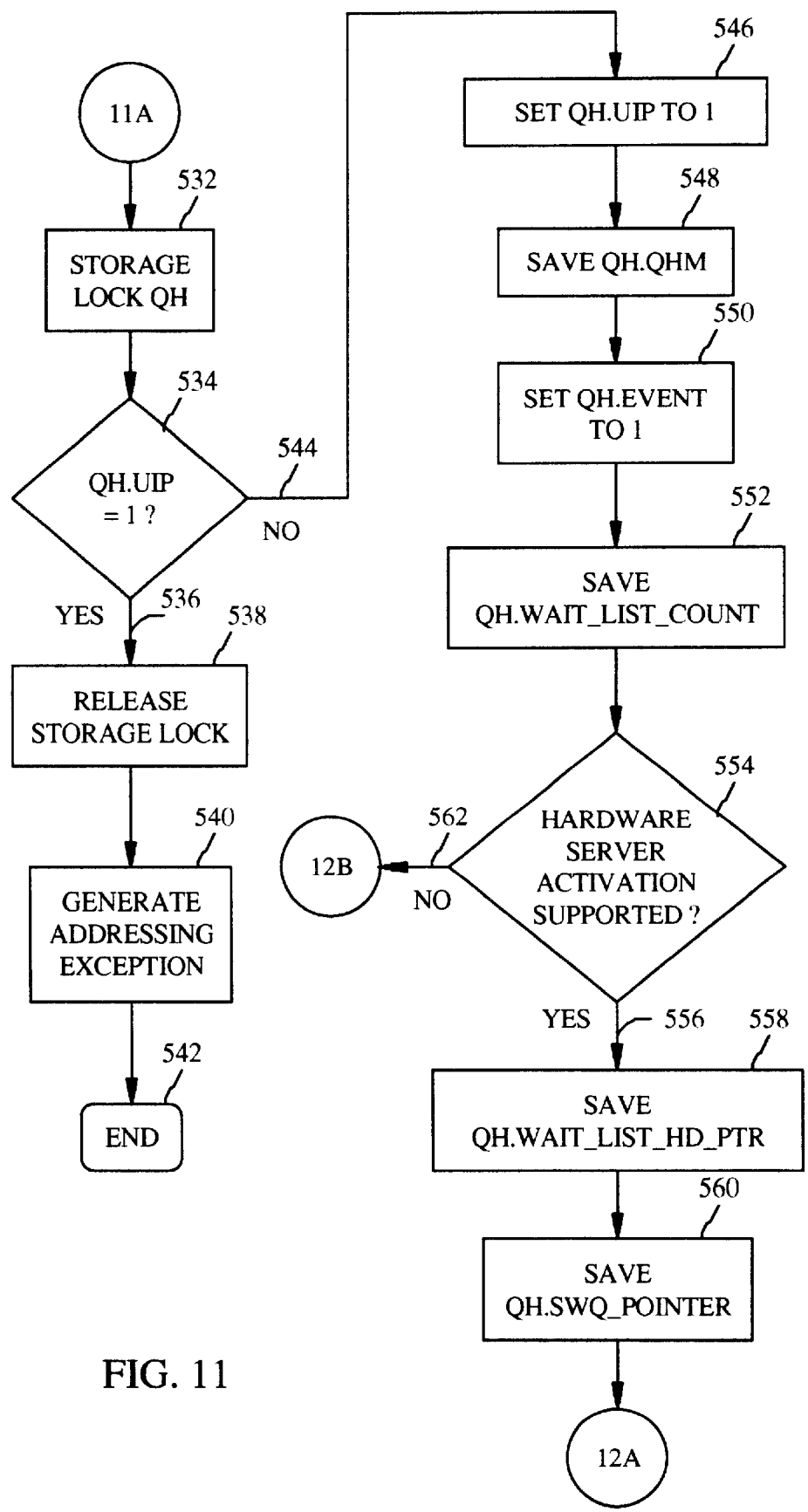

FIG. 11 shows the processing steps for enqueuing an event. At Step 532, the Queue Header is storage locked to prevent access to the Queue by other processes. If the Update In Progress (UIP) bit is set (Test Step 534), then Yes path 536 is taken to Step 538. If the UIP is already set, an error has been detected. At Step 538, the storage lock is released. An addressing exception is generated at Step 540 and processing ends at End Step 542. If the UIP bit is not set, then No path 544 is taken to Step 546, where the UIP bit is set. Next, at Step 548, the Queue Header Monitor bit in the Queue Header is saved. At Step 550, the Event bit in the Queue Header is set, to indicate to the receiving process that an event has occurred. At Step 552, the Wait List Count of the Queue Header is saved. If hardware server activation is supported (Test Step 554), then Yes path 556 is taken to Step 558, where the Wait List Head Pointer of the Queue Header is saved. Next, at Step 560, the Switching Queue Pointer for the Queue Header is saved. Processing continues on FIG. 12 via connector 12A. If hardware server activation is not supported, No path 562 is taken to FIG. 12 via connector 12B.

Figure 12:
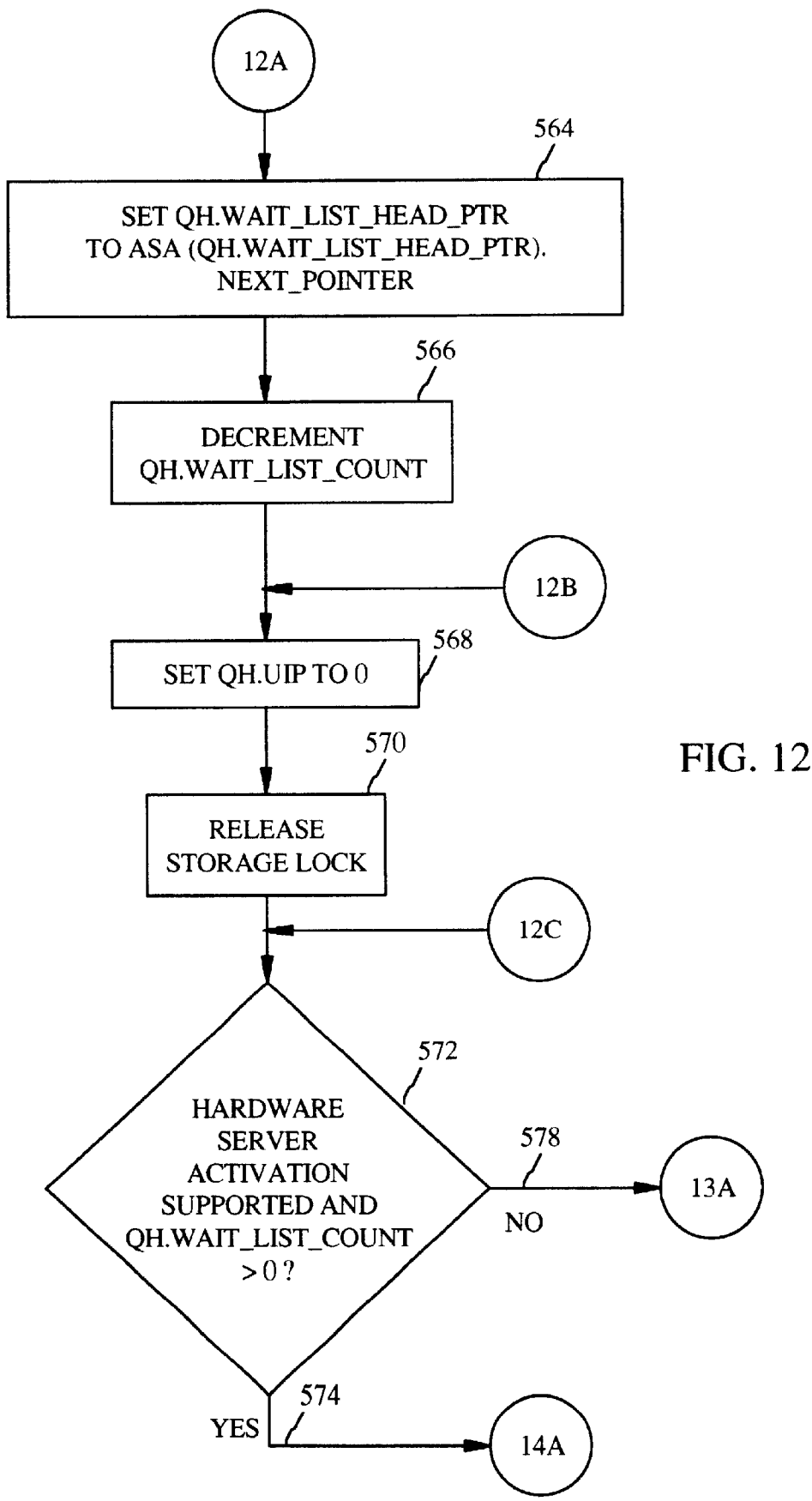

At Step 564 on FIG. 12, the server process is removed from the Wait List by setting the Wait List Head Pointer for the Queue Header to the Next Pointer of the Wait List Head Pointer for the Queue Header which is referenced by the Activity Save Area (ASA). Next, at Step 566, the Wait List Count for the Queue Header is decremented. The UIP bit is set to 0 at Step 568, and the storage lock is released at Step 570, thereby allowing access to the Queue. If hardware server activation is supported (Test Step 572) and the Wait List Count for this Queue is greater than zero (i.e., there is a process waiting to dequeue the entry from the Queue), then Yes path 574 is taken to FIG. 14 via connector 14A, where execution of the Enqueue to Switching Queue (ENQSWQ) steps is done. The ENQSWQ steps move a server process from the Wait List to a Switching Queue. The ENQSWQ steps are detailed below in FIG. 14 and 15. If hardware server activation is not supported, No path 578 is taken to FIG. 13 via connector 13A.

Figure 13:
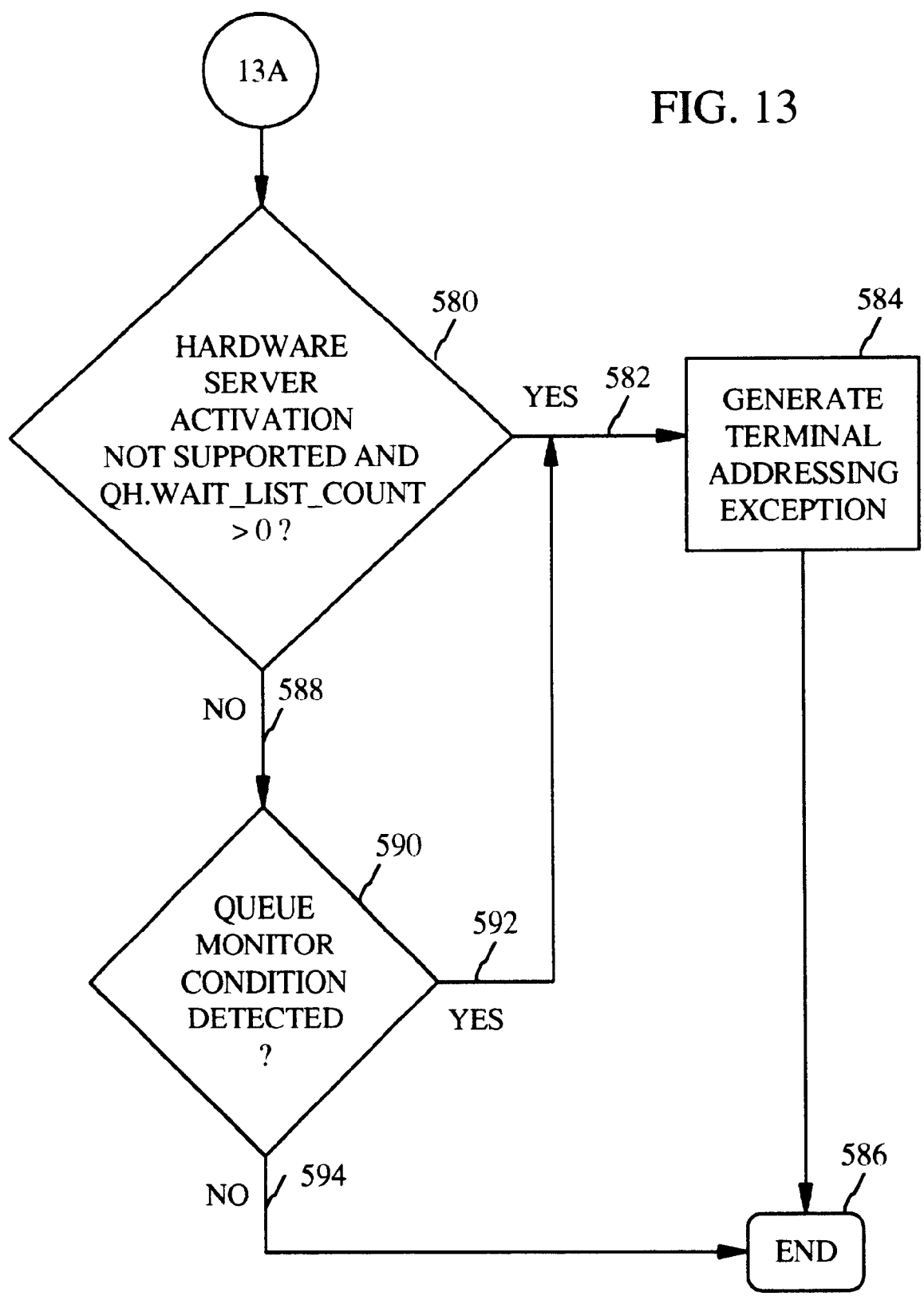

Referring now to FIG. 13, at Test Step 580, if hardware server activation is not supported and the Wait List Count for the Queue Header is greater than zero, then an error is detected. Yes path 582 is taken to Step 584, where a terminal addressing exception is generated. Processing then ends at End Step 586. If the above condition is not satisfied, then No path 588 is taken to Test Step 590. At this step, if a Queue Monitor condition is detected, then Yes path 592 is taken to Step 584 for further error processing. Otherwise, No path 594 is taken to conclude Enqueue/Enqueue To Front instruction processing.

Figure 14:
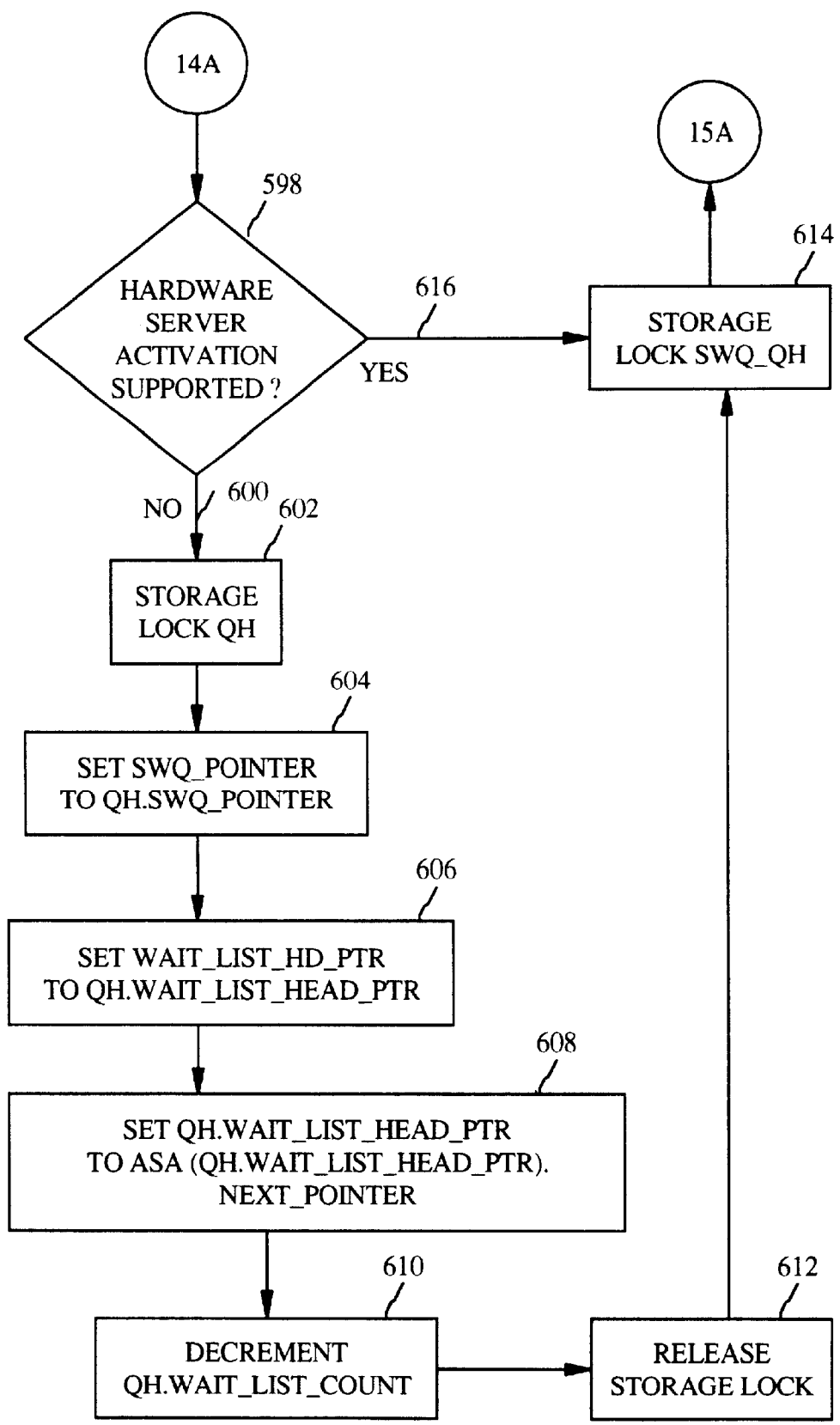

Turning now to FIG. 14, the steps for performing an enqueue to a Switching Queue are shown. The ENQSWQ algorithm moves a server process from the Wait List to a Switching Queue. If hardware server activation is supported, these steps are performed by the computer system hardware. The Wait List Head Pointer and the Switching Queue Pointer were previously saved at Steps 492 and 494, respectively. If hardware server activation is not supported, the following steps are performed in the preferred embodiment by 2200 Operating System Executive (EXEC) software. If hardware server activation is not supported (Test Step 598), No path 600 is taken to Step 602. At Step 602, the Queue Header is storage locked. The Switching Queue Pointer is set to the Switching Queue Pointer of the Queue Header at Step 604. Next, at Step 606, the Wait List Head Pointer is set to the Wait List Head Pointer of the Queue Header. At Step 608, the Wait List Head Pointer of the Queue Header is set to the Next Pointer of the Wait List Head Pointer of the Queue Header referenced by the Activity Save Area for the executing process. The Wait List Count of the Queue Header is then decremented at Step 610. The storage lock of the Queue Header is then released at Step 612. Processing continues at Step 614. If hardware server activation is supported, then Yes path 616 is taken directly to Step 614. At this step, the Queue Header of the Switching Queue is storage locked. Processing then continues on FIG. 15 via connector 15A.

Figure 15:
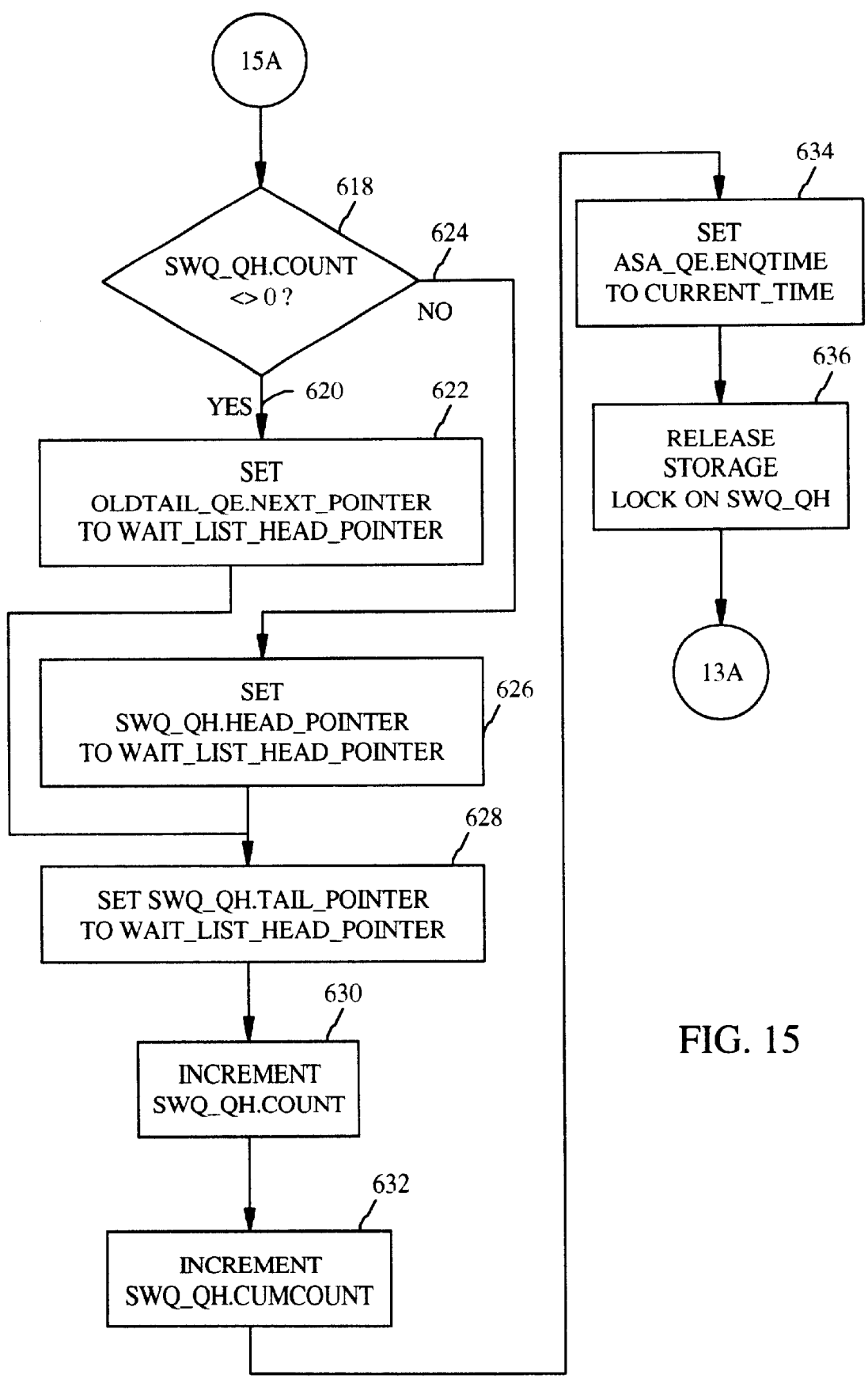

At Test Step 618 on FIG. 15, if the number of waiting processes on the Switching Queue (as determined by the Count) is non-zero, then Yes path 620 is taken to Step 622. At Step 622, the Oldtail Queue Entry's Next Pointer is set to the Wait List Head Pointer. If the Queue Header of the Switching Queue has a Count of zero, then No path 624 is taken to Step 626. At Step 626, the Switching Queue's Head Pointer is set to the Wait List Head Pointer. Processing in either case continues at Step 628, where the Switching Queue's Tail Pointer is set to the Wait List Head Pointer. Next, at Step 630, the Switching Queue Count is decremented. At Step 632, the Cumulative Count (Cumcount) for the Switching Queue is incremented. The Enqueue Time (ENQTIME) of the current process's Activity Save Area (ASA) is set to the Current Time from the system dayclock at Step 634. At Step 636, the storage lock on the Queue Header of the Switching Queue is released and processing of the ENQSWQ ends. Enqueue processing, however, continues on FIG. 13 via connector 13A.

Examples of using the Enqueue (ENQ) and Enqueue To Front (ENQF) instructions as part of a high-level language implementation are shown below.

A. Enqueue

Instruction Format: ENQ a,*d,*x,b
Input: Queue Header, Queue Entry, Queue Entry Upper Limit
Output: Initial Count
C Function: int enqueue(queue_header header_pointer,
                       queue_entry entry_pointer,
                       int upper_limit):
Note: The upper_limit is ignored if the Resize On ENQ flag in the Queue Header Control Area is not set.
C Library Routine:

® 1994 Unisys Corporation
enqueue*

| | | |
|---|---|---|
| LBU | B9, A1 | .Base parameter list |
| LXI, H1 | A0, 4, , B9 | .Load Queue Entry |
| LXM, H2 | A0, 7, , B9 | .Load upper limit |
| ENQ | A0, 1, , B9 | .Enqueue the Queue Entry |
| L | A0, A1 | .Return the initial count |
| RTN | | |

B. Enqueue To Front

Instruction Format: ENQF a,*d,*x,b
Input: Queue Header, Queue Entry, Queue Entry Upper Limit
Output: Initial Count
C Function: int enqueue_to_front(queue_header header_pointer,
                                queue_entry entry_pointer,
                                int upper_limit):
Note: The upper_limit is ignored if the Resize On ENQ flag in the Queue Header Control Area is not set.
C Library Routine:

® 1994 Unisys Corporation
enqueue_to_front*

| | | |
|---|---|---|
| LBU | B9, A1 | .Base parameter list |
| LXI, H1 | A0, 4, , B9 | .Load Queue Entry |
| LXM, H2 | A0, 7, , B9 | .Load upper limit |
| ENQF | A0, 1, , B9 | .Enqueue the Queue Entry |
| L | A0, A1 | .Return the initial count |
| RTN | | |

C. Enqueue Event

Instruction Format: ENQ a,*d,*x,b
Input: Queue Header
Output: None
C function: void enqueue_event(queue_header header_pointer);
C Library Routine:

® 1994 Unisys Corporation
enqueue_event*

| | | |
|---|---|---|
| LBU | B9, A1 | .Base parameter list |
| L, U | A6, 0 | .Set queue entry = 0 |
| | | .(enqueue event) |
| ENQ | A6, 1, , B9 | .Enqueue the event |
| RTN | | .Return |

The invention has been described in its presently contemplated best mode, and clearly it is susceptible to various modifications, modes of operation and embodiments, all within the ability and skill of those skilled in the art and without the exercise of further inventive activity. Accordingly, what is intended to be protected by Letters Patent is set forth in the appended claims.

What is claimed is:

1. In a computer system executing a plurality of processes controlled by a computer operating system, the computer system having at least one processor for executing instructions and a main storage unit directly accessible by the plurality of processes, units of data storage residing in the main storage unit called queue banks, each of the queue banks being capable of representing a queue header element or a queue entry element, the computer system further having one or more queues, each of the one or more queues including a linked list of one queue header and zero or more queue entries, a queue entry being used for storing a group of data signals to be communicated between selectable sending ones and selectable receiving ones of the plurality of processes, the queue header being used to store queue control information including queue links and an event indicator, an enqueue system supporting interprocess communication by one of the selectable sending ones of the plurality of processes executing an enqueue instruction available as part of the instruction set architecture of the computer system, the enqueue system supporting interprocess communication comprising:

queue access means for allowing the one of the selectable sending ones of the plurality of processes to directly read from, and to directly write to, a selected queue selected by the enqueue instruction;

queue entry access means for reading from and writing to a new queue entry selected by the enqueue instruction; and queue updating means for modifying the queue links connecting the queue header and the queue entries of said selected queue to add said new queue entry to said selected queue and to remove said new queue entry from the visibility of the one of the selectable sending ones of the plurality of processes.

2. The enqueue system supporting interprocess communication of claim 1, wherein said queue updating means performs an enqueue to front operation to modify said queue links connecting said queue header and said queue entries of said selected queue to add said new queue entry to said selected queue following said queue header of said selected queue, if said enqueue to front operation is allowed by said queue header of said selected queue.

3. The enqueue system supporting interprocess communication of claim 1, further including means for modifying the event indicator in said queue header of said selected queue to communicate that an event has occurred.

4. The enqueue system supporting interprocess communication of claim 1, further including means for activating a previously suspended one of the plurality of processes in response to said new queue entry being added to said selected queue if said selected queue had no queue entries or in response to the event indicator in said queue header of said selected queue being changed to indicate that an event has occurred.

5. A computer system for executing a plurality of processes controlled by a computer operating system having at least one processor for executing instructions and a main storage unit directly accessible by the plurality of processes wherein the main storage unit is capable of storing one or more queues, each of the one or more queues being a linked list of one queue header linked through queue links to zero or more queue entries, an interprocess communication supporting system, comprising:

a plurality of queue banks residing in the main storage unit, each of said queue banks to represent a queue header or a queue entry, each queue entry to store control signals and message data received from an identified one of the plurality of processes, each said queue header to include control signals and an event indicator;

instruction processing circuitry included in the processor and directly coupled to the main storage unit to execute, within said identified one of the plurality of processes, an enqueue instruction to add a new queue entry to a selected one of the one or more queues, said enqueue instruction having operands to select said new queue entry and said selected one of the one or more queues, said enqueue instruction processing circuitry including:

queue access circuitry to read from and write to said selected one of the one or more queues;

queue entry access circuitry to read from and write to said new queue entry; and queue updating circuitry to update the control signals included in said selected one of the one or more queues and to update the control signals included in said new queue entry to add said new queue entry to said selected one of the one or more queues and to remove said new queue entry from the visibility of said identified one of the plurality of processes.

6. The interprocess communication supporting system of claim 5, wherein said queue updating circuitry modifies the queue links connecting the queue header and the queue entries of said selected one of the one or more queues to add said new queue entry to the head of said selected one of the one or more queues, if enqueuing to the head of said selected one of the one or more queues is allowed by said queue header.

7. The interprocess communication supporting system of claim 5, further including a modifying circuit to modify the event indicator in said queue header of said selected one of the one or more queues to communicate that an event has occurred.

8. The interprocess communication supporting system of claim 5, further including an activating circuit to activate a previously suspended one of the plurality of processes in response to said new queue entry being added to said selected one of the one or more queues if said selected one of the one or more queues had no queue entries or in response to said event indicator in said queue header of said selected one of the one or more queues being changed to indicate that an event has occurred.

9. In a computer system having at least one processor for executing instructions, including an enqueue instruction which is part of the instruction set architecture of the computer system, the computer system further having units of data storage called queue banks, the at least one processor for executing a plurality of processes, each of the queue banks being capable of representing a queue header element or a queue entry element, each of the queue banks containing a control area for holding control information and a text area for holding message data words, the computer system further having a plurality of queues, each of the plurality of queues being a linked list of one queue header connected through links to zero or more queue entries, the links being stored in the control area of the queue banks representing the queue header and queue entries, each queue bank being accessed using a pointer stored in a queue bank descriptor data structure, queue bank descriptor data structures not currently in use being saved in an inactive queue bank descriptor list, and a queue being accessed via the queue bank descriptor data structure of its queue header, a system for executing an enqueue instruction by a sending one of the plurality of processes, the enqueue instruction to send message data words from the sending one of the plurality of processes to a receiving one of the plurality of processes by adding a new queue entry to a shared queue that is directly accessible to both the sending one of the plurality of processes and to the receiving one of the plurality of processes, an interprocess communication support system comprising:

first address calculation means for calculating the address of the queue bank descriptor data structure of the queue header of a selected shared queue selected by the operands of the enqueue instruction;

queue access means for providing read and write access to said queue header and queue entries of said selected shared queue using the pointer stored in said queue bank descriptor data structure of said queue header of said selected shared queue;

second address calculation means for calculating the address of the queue bank descriptor data structure of a new queue entry selected by said operands of the enqueue instruction;

queue entry access means for allowing said sending one of the plurality of processes to directly read from and to directly write to said new queue entry using the pointer stored in the queue bank descriptor of said new queue entry;

storage means for storing the number of message data words being stored in the text area of said new queue entry into the control area of said new queue entry;

queue update means for updating the links in the control area of said queue header and in the control area of the last queue entry of said selected shared queue to point to said new queue entry, thereby adding said new queue entry to the end of said selected shared queue; and queue bank descriptor maintenance means for returning said queue bank descriptor data structure of said new queue entry to the inactive queue bank descriptor list for preventing said sending one of the plurality of processes from further writing to said new queue entry.

10. The an interprocess communication support system of claim 9, further including means for activating a previously suspended one of the plurality of processes in response to said new queue entry being added to said selected shared queue if said selected shared queue had no queue entries or in response to the event indicator in said queue header of said selected shared queue being changed to indicate that an event has occurred.

11. In a computer system having at least one processor for executing instructions which are included in the instruction set of the computer system, the computer system further having units of data storage called queue banks, each queue bank being capable of representing a queue header or a queue entry, each queue bank containing a control area for holding control information and a text area for holding message data words, the computer system further having one or more queues, each of the one or more queues being a linked list of one queue header and zero or more queue entries wherein the one queue header and zero or more queue entries are interconnected via links, the links being stored in the control area of the queue banks representing the queue header and queue entries, the computer system having at least one client process and at least one server process, the at least one client process being capable of directly accessing the queue, and the at least one server process being capable of directly accessing the queue, executing a single instruction by the processor within said client process to add a new queue entry to a queue to support interprocess communication, the method comprising the steps of:

(a) calculating the address of the queue header of a selected one of the one or more queues selected by the operands of the instruction;

(b) calculating the address of a new queue entry selected by said operands of the instruction; and (c) directly writing to the links in the control area of said queue header and of the last queue entry of said selected one of the one or more queues to point to said new queue entry to add said new queue entry to said selected one of the one or more queues and to deny the at least one client process from further read and write access to said new queue entry.

12. The method of claim 11, wherein said updating step updates said links in said control area of said queue header of said selected one of the one or more queues and the control area of said new queue entry, thereby adding said new queue entry to the front of said selected one of the one or more queues.

13. In a computer system having at least one processor for executing hardware instructions and units of data storage called queue banks, each queue bank being capable of representing a queue header element or a queue entry element, each queue bank containing a control area for holding control information and an event indicator, the computer system further having data structures called queues, each of the queues being a linked list of one queue header and zero or more queue entries, the computer system having at least one client process and at least one server process, the at least one client process and the at least one server process each being capable of directly accessing selectable ones of the queues, a method of executing a single one of the hardware instructions including specified operands by a selectable one of the at least one client process running on the processor to add a new event indicator to one of the queues comprising the steps of:

(a) calculating the address of the queue header of a selected one of the queues selected by the operands of the single one of the hardware instructions; and (b) updating the event indicator in the control area of said queue header of said selected one of the queues, the selectable one of the at least one client process thereby communicating to a selectable one of the at least one server process that an event related to said selected one of the queues has occurred.

14. In a computer system for executing multiple processes having at least one processor for executing hardware instructions and units of data storage called queue banks directly accessible by the at least one processor, each of the queue banks being capable of representing a queue header element or a queue entry element, each of the queue banks containing a control area for holding control information and a text area for holding message data words, the computer system further having a queue being a linked list of one queue header linked through links to zero or more queue entries, the links being stored in the control area of the queue banks representing the queue header and queue entries, a queue bank being accessed via a queue bank descriptor data structure, queue bank descriptor data structures not currently in use being saved in an inactive queue bank descriptor list, and a queue being accessed using a pointer stored in the queue bank descriptor data structure of its queue header, a method of executing a single hardware instruction, including specified operands, by an identified one of the multiple processes running on one of the at least one processor to add a new queue entry to a queue comprising the steps of:

(a) calculating the address of the queue bank descriptor data structure of the queue header of a selected queue selected by the operands of the single hardware instruction;

(b) accessing said queue header and the queue entries of said selected queue by using the pointer stored in the queue bank descriptor data structure of said queue header of said selected queue;

(c) calculating the address of the queue bank descriptor data structure of a new queue entry selected by said operands of the single hardware instruction;

(d) accessing said new queue entry by using the pointer stored in the queue bank descriptor data structure of said new queue entry;

(e) directly storing the number of message data words being used in the text area of said new queue entry into the control area of said new queue entry; and (f) updating the links in the control area of said queue header and the last queue entry of said selected queue to point to said new queue entry, thereby adding said new queue entry to the end of said selected queue and preventing the identified one of the multiple processes from further accessing said new queue entry.

15. The method of claim 14, further including the step of:

(g) returning said queue bank descriptor data structure of said new queue entry to the inactive queue bank descriptor list.

16. The method of claim 14, wherein said updating step updates the links in said control area of said queue header of said selected queue and said control area of said new queue entry, thereby adding said new queue entry to the front of said selected queue, if enqueuing to said front of said selected queue is allowed by said queue header.

17. In a computer system having multiple processes executed by at least one processor for executing instructions which are part of the instruction set of the computer system and units of data storage called queue banks, each queue bank being capable of representing a queue header element or a queue entry element of a queue, each queue bank containing a control area for holding control information and an event indicator, and a text area for holding message data words, the computer system having a queue being a linked list of one queue header and zero or more queue entries, the computer system storing data structures called queue bank descriptors, each of the queue bank descriptors storing a pointer to a queue bank, and a queue being accessed via the queue bank descriptor of its queue header, executing a single enqueue instruction within one of the multiple processes to add a new event indicator to a queue, the enqueue instruction having a plurality of operands, the method steps comprising:

(a) calculating the address of the queue bank descriptor of the queue header of a selected queue selected by the plurality of operands of the enqueue instruction;

(b) directly accessing the queue header of said selected queue by referencing the queue bank descriptor of the queue header of said selected queue; and (c) updating the event indicator in the control area of the queue header of said selected queue, thereby communicating to a different one of the multiple processes that an event relating to said selected queue has occurred.

18. In a computer system having a processor for executing multiple processes, the computer system having a machine instruction set including instructions to be executed by the processor, the computer system further having a memory having units of data storage called queue banks which are directly accessible to the processor, the computer system further having a plurality of queues, each of the queues consisting of a header and a linked list of entries, wherein each of the entries in the linked list of entries consists of a queue bank containing control signals and message data signals and wherein the header contains control signals, the method of interprocess communication performed by an identified one of the multiple processes executing an enqueue instruction which is part of the machine instruction set, comprising:

identifying one of the plurality of queues as the selected queue;

identifying a selected one of the queue banks to be added to said selected queue wherein said selected one of the queue banks contains message data signals directly written into said selected one of the queue banks by the identified one of the multiple processes and which are to be communicated to a different one of the multiple processes;

modifying the control signals in predetermined ones of the linked list of entries of said selected queue and modifying the control signals in said selected one of the queue banks to indicate that said selected one of the queue banks is one of said linked list of entries of said selected queue; and preventing the identified one of the multiple processes from further reading to or writing from said selected one of the queue banks, thereby protecting said message data provided by the identified one of the multiple processes from further modification by the identified one of the multiple processes.

19. The method of claim 18 wherein said modifying step modifies the control signals in predetermined ones of the linked list of entries of said selected queue and modifies the control signals in said selected one of the queue banks to indicate that said selected one of the queue banks is the first entry in said linked list of entries of said selected queue.

20. The method of claim 18, and further including the step of activating a previously suspended one of the multiple processes after said modifying step if said selected one of the queue banks is the only entry in said linked list of entries of said selected queue.

21. The method of claim 18, and further including the step of modifying the control signals in the header of said selected queue to communicate that an event occurred.

22. The method of claim 21, and further including the step of activating a previously suspended process in response to said step of modifying said control signals in said header of said selected queue.

* * * * *